May 9, 1967  N. B. HAMLIN ETAL  3,319,165
APPARATUS FOR MEASURING THE PHASE DELAY OF A SIGNAL CHANNEL
Filed Aug. 18, 1964

INVENTORS
NORRIS B. HAMLIN
CHARLES J. MULA
BY
ATTORNEY

3,319,165
APPARATUS FOR MEASURING THE PHASE DELAY OF A SIGNAL CHANNEL
Norris B. Hamlin, Chelmsford, and Charles J. Mula, Waltham, Mass., assignors to Sylvania Electric Products Inc., a corporation of Delaware
Filed Aug. 18, 1964, Ser. No. 390,412
1 Claim. (Cl. 324—84)

This invention relates to phase measuring techniques, and more particularly to phase measuring techniques which are insensitive to variations in frequency or amplitude.

It is often necessary in the microwave art to determine the phase of a signal component or signal channel. For example, in phased antenna arrays, the relative phase of the several antenna element channels must be precisely adjusted to desired values to provide proper system operation. In general, known phase measuring apparatus determines the phase by comparing the signal channel under test with a reference signal of known phase. A test signal is transmitted to the unknown channel and to the reference channel and the two signals are compared in an electrical interferometer, such as a slotted line, in which a standing wave pattern is produced. The electrical center is determined by locating a signal null on either side of the voltage maximum of the standing wave pattern, and then locating the point of maximum voltage which is one quarter wavelength from the null. The location of the null, however, shifts with frequency making these measurement methods frequency-sensitive. These methods are also sensitive to variations in the amplitude of the applied signals. Thus, the accuracy of the measurement is limited by the amplitude and frequency stability of the RF energy source and the components of the measuring apparatus. Another disadvantage of the present measurement methods is their relatively poor sensitivity, necessitating test signals of substantial power levels if signal channels having substantial loss are being measured. It is an object of the present invention to provide an extremely sensitive measuring technique by which phase measurements can be made which are insensitive to variations in frequency and amplitude of the signal being measured.

Briefly, a standing wave pattern is produced in a slotted line by a test signal applied through a reference path to one terminal of the slotted line, and through the signal path being measured to the other terminal of the slotted line. A standing wave pattern is produced in the slotted line by the interaction of these two signals and a voltage maximum or voltage null, depending on the mode of excitation, exists at the electrical center of the slotted line; this point does not shift in location with variations in amplitude or frequency of the test signal. If the two signals applied to the slotted line are of equal phase, a voltage maximum will exist at the electrical center; if the signals are of opposite phase, a null will exist at the electrical center. The location of this voltage maximum or null is determined, according to the invention, by a pair or probes located on a carriage movable along the length of the slotted line. The outputs of the two probes are compared by switching from one probe to the other while observing the relative amplitudes on a suitable output device, such as a voltmeter or an oscilloscope, the carriage being moved along the slotted line until the readings from the two probes are equal. The electrical center of the two signal paths is then found by locating the point midway between the probes, the phase of the signal path under test being easily calculated from the location of the electrical center.

The foregoing, together with other objects, features, and advantages of the present invention will be more fully understood from the following detailed description, taken in conjunction with the drawings, in which.

A pair of coherent signals propagating in opposite directions along a transmisison path will produce a standing wave pattern having a voltage maximum at the electrical center of the transmission paths. This voltage maximum is independent of the signal frequency and will, therefore, remain fixed in position as the frequency changes. This fact is utilized in the present invention to determine the phase of a signal by a method which is insensitive to frequency variation. In brief, the electrical center of a standing wave pattern is determined by taking amplitude measurements along the pattern until equal amplitude readings are obtained. A point midway between the position of these equal amplitude readings is then the exact electrical center of the transmission paths. This situation is shown graphically in FIG. 1 wherein a standing wave pattern $f_1$ is depicted due to interaction of the two coherent signals. It is evident that the voltage maximum and hence the electrical center C can be determined by locating points of equal amplitude, such as points A and B, on opposite slopes of the voltage maximum. In practice, voltage measurements are most easily made by means of a slotted line in which a pair of probes are located and suitably spaced so that each probe senses the amplitude of respective opposite slopes of the voltage maximum. The two probes, typically, are attached to a carriage slidably mounted on the slotted line.

Figure 2:
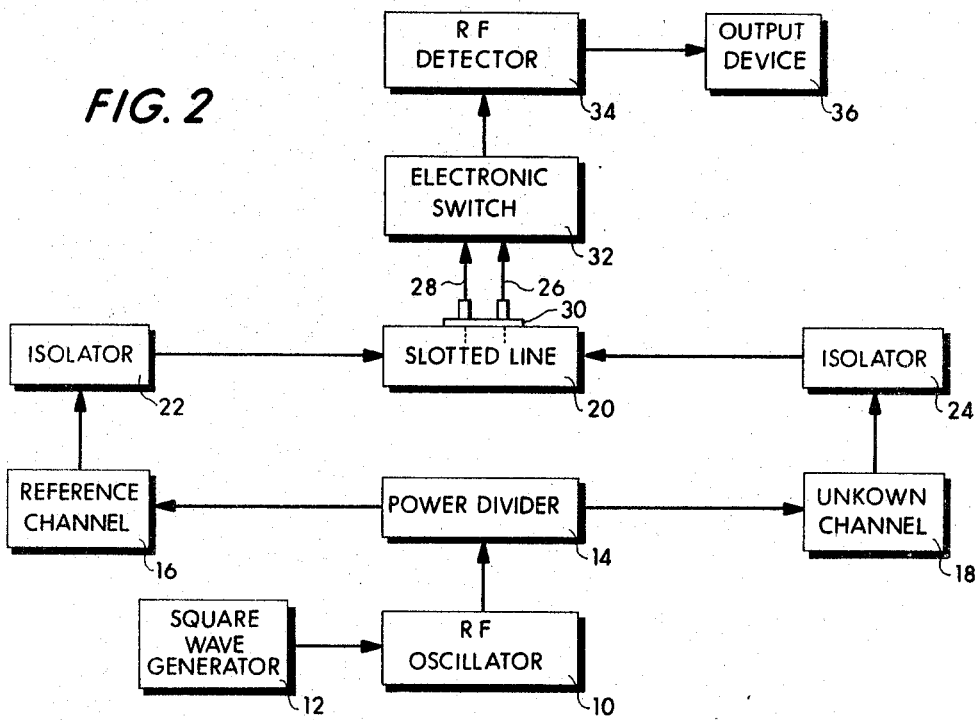
FIG. 2 is a block diagram of a preferred embodiment of the present invention.

Apparatus for performing the phase measurement according to the invention is shown diagrammatically in FIG. 2. A test signal generated by an RF oscillator 10 is applied to a power divider 14 which produces a pair of equal-amplitude, equal-phase signals. One of these signals is applied via reference path 16 to an isolator 22 and then to one input terminal of a slotted line 20. The other signal is applied via an unknown path 18, the phase delay of which is to be determined, to a second isolator 24 and then to the other input terminal of slotted line 20. A pair of probes 26 and 28 are mounted on a slidable carriage 30 and extend into the slotted line. These probes are connected to an electronic switch 32 the output of which is applied to an RF detector 34, such as a superheterodyne receiver, the output of which, in turn, is applied to an output device 44, such as a vacuum tube voltmeter or an oscilloscope.

Figure 1:
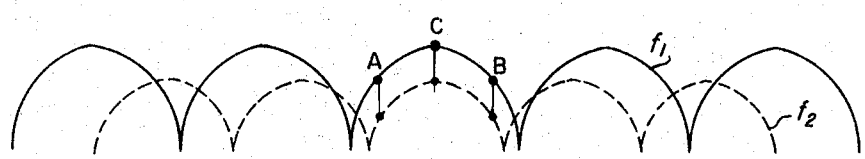
FIG. 1 is a plot of a pair standing wave pattern useful to illustrate the operation of the present invention.

Probes 26 and 28 are spaced to sense the amplitude of points on opposite slopes of the voltage maximum, such as points A and B in the standing wave pattern $f_1$ of FIG. 1. The spacing of the the probes is not critical but can be adjusted to provide the requisite sensitivity while still being above the noise level. The noise level generally does not rise above the lower amplitude levels of the standing wave pattern; thus, the probe spacing should be chosen to insure that the points sensed by the probes are above this noise region. In practice, a spacing of approximately four tenths of a wavelength ($.4\lambda$) has been found satisfactory. For reasons to be explained, the test signal is modulated by a square wave generator 12 when a voltmeter is used as the readout device. Isolators 22 and 24 prevent unwanted reflections due to slight impedance mismatch in the equipment and also prevent the test signals from each signal path from propagating to the other signal path. These isolators can be eliminated with no significant loss of performance by using cables having 5–10 db loss to connect each signal path to the slotted line.

A power divider producing equal-amplitude, oppositely-phased signals could, alternatively, be used in place of the equal-amplitude, equal-phase power divider. In this event, the standing wave pattern would have a voltage null at the electrical center, rather than a voltage maximum. The measurement method, however, is the same in both instances. For simplicity, the discussion will refer to a standing wave pattern having a voltage maximum at the electrical center, it being understood that a pattern having a a null could be substituted therefor.

In operation, the signals applied to the slotted line via signal paths 16 and 18 produce a standing wave pattern in the slotted line which has a frequency insensitive voltage maximum at the electrical center of the transmission paths formed by the power divider 14, signal paths 16 and 18, isolators 22 and 24, and slotted line 20. The carriage 30 together with probes 26 and 28 is moved along the slotted line until the readings from the two probes are equal. The electrical center of the two signal paths is then determined by locating the point halfway between the probes. The phase can be computed from the location of the electrical center by well known calculations. The comparison of the signal amplitudes from probes 26 and 28 is expedited by means of electronic switch 32 which switches between probes 26 and 28 to alternately apply the signal from each probe to the output device.

When using a vacuum tube voltmeter as a readout device, the test signal is modulated by a square wave from square wave generator 12. The square wave signal is heterodyned with the sampled signal produced by electronic switch 32 to produce an output signal having a frequency equal to the difference between the sampling rate of electronic switch 32 and the frequency of square wave generator 12. If the output frequency is chosen to be several cycles per second, then the needle of the output voltmeter will flutter at this rate, thereby providing a visual means of determining the electrical center of the transmission paths. The voltmeter needle will flutter when the probes receive signals of unequal amplitude since the voltmeter is reading the difference in amplitude between the two probe readings; however, the needle will become stationary when the probes receive signals of equal amplitude since the difference in amplitude is now zero. As an example, phase measurements have been performed using a square wave generator frequency of 1000 cycles per second and an electronic switch frequency of 1006 cycles per second. Thus, the voltmeter needle will flutter at a 6 cycle per second rate until the electrical center is reached, as determined by the equal amplitude signals sensed by the two probes which causes the flutter to cease. The electrical center can, therefore, easily be determined by observing the position of the carriage on the slotted line at which the voltmeter needle becomes stationary. The difference in this carriage position and a previously determined reference position is then a measure of the phase delay of the signal path under test.

Figure 3:
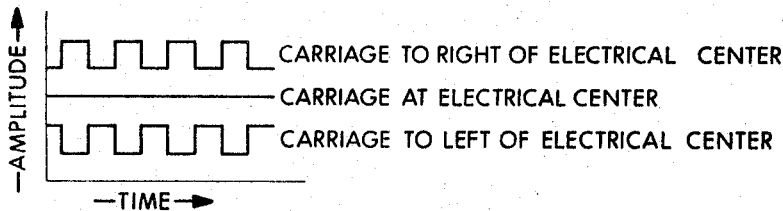
FIG. 3 is a plot of waveforms useful in illustrating the operation of the invention.

When an oscilloscope is employed as a readout device, the square wave modulation is not needed; only a continuous wave test signal is necessary. In this case, the output waveform appearing at the output of the RF detector is a square wave having a frequency determined by the sampling rate of electronic switch 32. This output waveform is of one polarity when the probes are on one side of the electrical center and of opposite polarity when the probes are on the other side of the electrical center. At the exact electrical center, the square wave signals cancel to produce a direct current output waveform. These output waveforms are depicted in FIG. 3. It is seen that the output waveform becomes zero at the electrical center and then reverses polarity as the carriage is moved past the electrical center toward the opposite end of the slotted line. In this manner the electrical center can be easily determined by noting the carriage position at which the output waveform on the oscilloscope becomes a straight line.

There is shown in FIG. 1, a second standing wave pattern $f_2$ of a different frequency than that of $f_1$. The second standing wave pattern is useful to further check the location of the electrical center, as ambiguity is possible with a single standing wave pattern due to the existence of voltage maxima every half wavelength. As heretofore stated the location of the electrical center is invariant with frequency, therefore the use of the second pattern serves to eliminate the possible ambiguity which can arise with the use of only one standing wave pattern.

The carriage position on the slotted line can be determined consistently to an accuracy of $\pm 1$ millimeter which, at a test frequency of 1000 megacycles, represents a phase change of 0.24 degree, and at a frequency of 30 megacycles represents a phase change of 0.072 degree. With some training, an operator can make measurements to an accuracy of $\pm 0.05$ millimeter. Using precision microwave components to implement apparatus of the type shown in FIG. 2, a sensitivity of $-65$ dbm has been obtained, this sensitivity level being defined as the minimum test signal into the slotted line that will give repeatable measurements to an accuracy of $\pm 0.1$ millimeter. The accuracy and sensitivity of the phase measurement is not affected by inequality in the amplitude of the two signals applied to the slotted line, an amplitude difference up to approximately ten decibels being tolerable without degradation in performance. Signals differing in amplitude by more than ten decibels can be suitably attenuated by one of several well known means before the signals are applied to the slotted line for phase measurement. The maximum permissible frequency variation that can occur without degrading performance is governed only by the operable frequency range of the measuring apparatus.

From the foregoing, it is evident that an accurate, relatively simple phase measuring method has been provided which is not sensitive to variations in amplitude or frequency. Although a particular embodiment has been shown and described, the invention is not to be thereby limited except as indicated in the appended claim.

What is claimed is:

Apparatus for measuring the phase delay of a signal channel comprising, a signal channel whose phase delay is to be determined, a reference channel of known phase delay, a slotted line having first and second input terminals and a carriage slidably mounted thereon, said carriage having first and second probes mounted thereon and extending into said slotted line to couple energy therefrom, said probes being spaced in the length direction of said line to sense respective opposite slopes of a voltage maximum of a standing wave pattern established in said slotted line, a source of modulated RF signals, means for applying said RF signals through said signal channel to the first input terminal of said slotted line, means for applying said RF signals through said reference channel to the second input terminal of said slotted line to produce a standing wave pattern in said slotted line, an RF detector having an input terminal and an output terminal, an electronic switch operative to alternately connect said first and second probes to the input terminal of said RF detector, the switching frequency of said switch being chosen relative to the frequency of said RF signals to produce a difference frequency output signal at the output terminal of said RF detector, and an output meter having a movable needle and operative in response to said difference frequency output signal to cause said needle to flutter when the signals from said probes are of unequal amplitude and to become stationary when said signals are of equal amplitude.

References Cited by the Examiner
UNITED STATES PATENTS 2,680,837 6/1954 Sensiper _____ 324—58
3,113,315 12/1963 Priekschat _____ 324—84 X RUDOLPH V. ROLINEC, *Primary Examiner.*

WALTER L. CARLSON, *Examiner.*

P. F. WILLE, *Assistant Examiner.*